United States Patent [19]
Krude

[11] 4,129,345
[45] Dec. 12, 1978

[54] BEARING ASSEMBLY FOR A MOTOR VEHICLE WHEEL

[75] Inventor: Werner Krude, Meisenweg, Fed. Rep. of Germany

[73] Assignee: Uni-Cardan AG, Lohmar, Rheinland, Fed. Rep. of Germany

[21] Appl. No.: 750,167

[22] Filed: Dec. 13, 1976

[30] Foreign Application Priority Data
Dec. 13, 1975 [DE] Fed. Rep. of Germany ....... 2556244

[51] Int. Cl.² .................. B60B 27/00; B60K 17/22
[52] U.S. Cl. .............................. 308/191; 64/21; 64/32 R; 180/43 R; 301/105 R; 308/187.1; 308/DIG. 8
[58] Field of Search ................. 308/191–192, 308/194, 16, 187, 210, 187.1, 211, 187.2, DIG. 7, DIG. 8, 241, 238; 180/43 R; 64/21, 22, 32 R; 277/81 R, 82; 301/105 R; 188/18 A

[56] References Cited
U.S. PATENT DOCUMENTS

| | | | |
|---|---|---|---|
| 2,685,184 | 8/1954 | Nador et al. | 180/43 R X |
| 2,822,880 | 2/1958 | Gregory | 64/21 X |
| 2,929,232 | 3/1960 | Muller | 64/32 R |
| 3,870,589 | 3/1975 | Shobert | 308/DIG. 8 X |
| 4,001,124 | 1/1977 | Hussey | 308/238 X |

*Primary Examiner*—Trygve M. Blix
*Assistant Examiner*—Douglas C. Butler
*Attorney, Agent, or Firm*—Edmund M. Jaskiewicz

[57] ABSTRACT

A bearing assembly has an outer bearing ring attached to a wheel support and an inner bearing ring within which is positioned the outer joint member of a constant velocity universal joint. The wheel hub is connected to the inner bearing ring and to the inner joint member of the universal joint. The wheel hub has a flange which may be positioned upon the inner bearing ring or inserted within the bore of the inner bearing ring to center the wheel hub with respect to the inner bearing ring.

9 Claims, 6 Drawing Figures

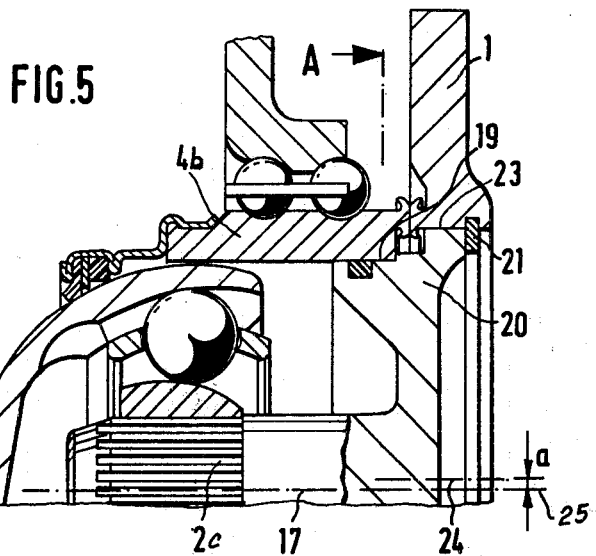
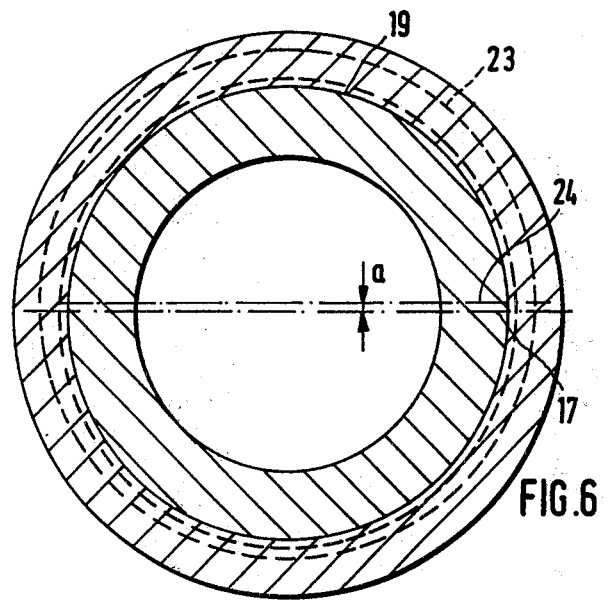

BEARING ASSEMBLY FOR A MOTOR VEHICLE WHEEL

The present invention relates to a wheel bearing assembly for a wheel hub which is driven through a constant velocity torque transmitting universal joint, more particularly, to the mounting of the inner bearing ring and universal joint with respect to the wheel hub.

A wheel hub of a motor vehicle may be driven through a constant velocity torque transmitting universal joint and the wheel hub is journaled in a wheel bearing assembly mounted on a wheel support. The bearing assembly has an outer bearing ring which is attached to the wheel support and the inner bearing ring is connected with the wheel hub and the universal joint. The inner bearing ring has a bore therethrough which receives the outer joint member of the universal joint.

Such wheel bearing assemblies have incorporated a one-piece construction of the inner bearing ring and the outer joint member of the universal joint and, in one form, also with the wheel flange. This construction has the disadvantage that these components are very difficult and expensive to manufacture. Further, grooves in the universal joint for receiving the torque transmitting balls, the surfaces for mounting of the bearings and the wheel flange must be constructed to different standards in order to satisfy different demands on these components. It is therefore necessary that these components be constructed of materials of different quality and characteristics.

A further disadvantage of such known wheel bearing assemblies is that it is extremely difficult to replace any of the components because in order to disassemble the power transmission shaft the entire bearing assembly must be either removed from its support or be disassembled. In addition, the flexible boot or bellows which is required to seal the interior of the joint can only be secured in position using additional fastener elements. This protective boot has the further disadvantage in that it is fully exposed to the rough environmental conditions encountered during driving on various roads and surfaces.

It is therefore the principal object of the present invention to provide a novel and improved wheel bearing assembly of the type described herein having a simple structure for assembling or removing the drive shaft to the wheel hub.

It is another object of the present invention to provide such a wheel bearing assembly having a simple yet effective seal for the constant velocity joint on the side of the wheel and to reduce the required bending angles of the universal joint.

It is a further object of the present invention to provide such a wheel bearing assembly wherein the distance between the center of the universal joint on the wheel side and the steering axis is maintained to a desired minimum.

According to one aspect of the present invention a bearing assembly for a motor vehicle wheel may comprise an outer bearing ring attached to a wheel support and an inner bearing ring which is connected to a wheel hub. A constant velocity universal joint has an outer joint member which is positioned within a bore of the inner bearing ring and an inner joint member which is connected by a shaft to the wheel hub. The bore of the inner bearing ring is at least equal to the outer diameter of the outer joint member. The wheel hub is provided with means for centering the wheel hub with respect to the inner bearing ring.

The wheel hub and inner bearing ring may be detachably or inseparably connected and the centering means may comprise a flange on the wheel hub which is positioned upon or inserted within the inner bearing ring.

Other objects and advantages of the present invention will be apparent upon reference to the accompanying description when taken in conjunction with the following drawings, which are exemplary, wherein;

FIG. 5 is a view similar to that of FIG. 3 but showing a modification thereof; and FIG. 6 is a sectional view taken along the line A of FIG. 5 but showing both halves of the section there through.

Proceeding next to the drawings wherein like reference symbols indicate the same parts throughout the various views a specific embodiment and modifications of the present invention will be described in detail.

Figure 1:
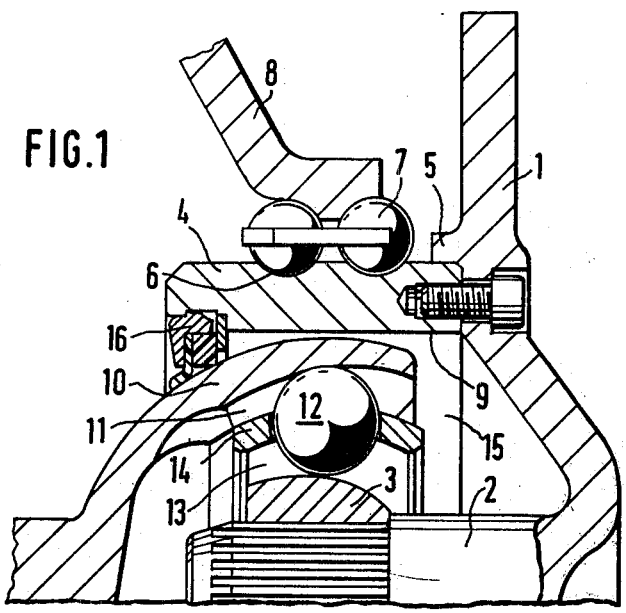
FIG. 1 is a half longitudinal sectional view of a wheel bearing assembly according to the present invention wherein the wheel hub and inner bearing ring are detachably connected.

As may be seen in FIG. 1, the wheel mounting or bearing assembly according to the present invention comprises a wheel hub or flange 1 which is provided along its outer edge with suitable fastening means for the wheel or for a brake disc. The wheel hub 1 is provided with an axially extending shaft or pin 2 whose end is provided with longitudinal splines upon which is nonrotatably mounted an inner joint member 3 of a constant velocity torque transmitting universal joint. The inner surface of the wheel hub 1 is provided with an axially extending flange or shoulder 5 having internal threads to which is threaded an inner bearing ring 4. The shoulder 5 also functions to center the inner bearing ring 4 with respect to the wheel hub 1.

The inner bearing ring 4 has on its outer peripheral surface a pair of annular grooves 6 in which are received balls 7 which are also received in correspondingly shaped grooves or shoulders on the inner surface of an outer bearing ring 8 which is attached to a wheel support structure not shown in the drawings but known in the art.

The inner bearing ring 4 has an axial bore 9 therethrough within which is disposed outer joint member 10 of the universal joint. The diameter of the bore 9 is at least equal to the outer diameter of the outer joint member 10 so that the outer joint member can be readily accommodated within the bore as shown in FIG. 1.

The outer joint member 10 has in its inner surface a plurality of substantially axially extending grooves 11 which are opposed from and correspond in number to similar axially extending grooves 13 formed in the outer surface of the inner joint member 3. A plurality of torque transmitting balls 12 are disposed in opposed pairs of the grooves 11 and 13 and the balls are positioned in openings within a retaining cage 14 disposed between the inner and outer joint members.

The interior of the universal joint and wheel flange is indicated at 15 and is sealed from the exterior by means of a contact seal 16 which is seated in an annular groove formed in the inner bearing ring 4. The seal is in contact with the outer peripheral surface of the outer joint member 10.

The inner joint member 3 is positioned upon the splined end of the shaft 2. In view of the shape and relationship of the grooves 11, 13, no additional structure is required to secure the inner joint member 3 against displacement in the axial direction.

The wheel hub 1 and the inner bearing ring 4 are formed as separate components and are connected by a plurality of bolts as shown in FIG. 1.

Figure 2:
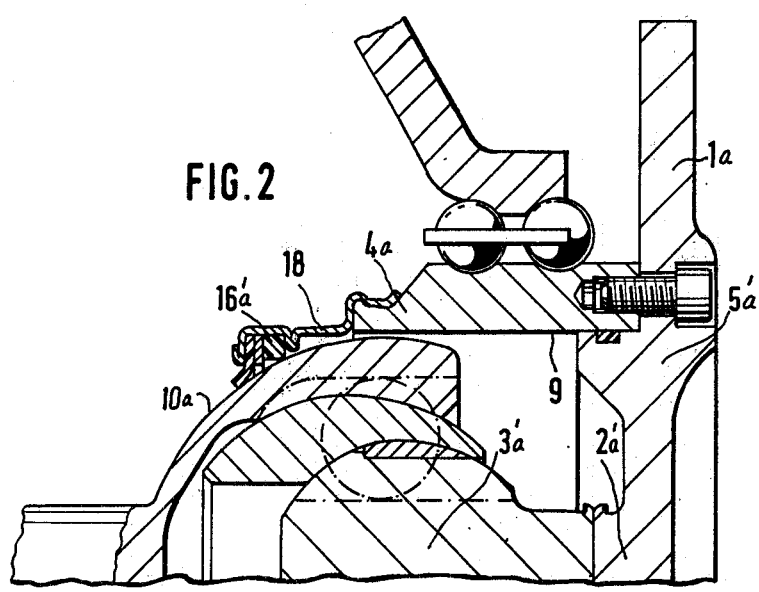
FIG. 2 is a view similar to that of FIG. 1 but showing a different form of a seal for the universal joint.

The wheel bearing assembly of FIG. 2 is similar to that of FIG. 1 with the exception that the wheel hub 1 is provided with a flange 5a which is inserted into the bore 9 of inner bearing ring 4a to center the inner bearing ring with respect to the wheel hub. In addition, the inner joint member 3a is welded to the pin or shaft 2 of the wheel hub 1 so as to be inseparably or permanently connected thereto. This unitary construction of the inner joint member and the wheel hub may also be an integral structure. In FIG. 2, a seal 16a which is in contact with the outer surface of outer joint member 10a of the universal joint is supported in a holder or retainer ring 18 attached to the outer peripheral surface of the inner bearing ring 4a.

Figure 3:
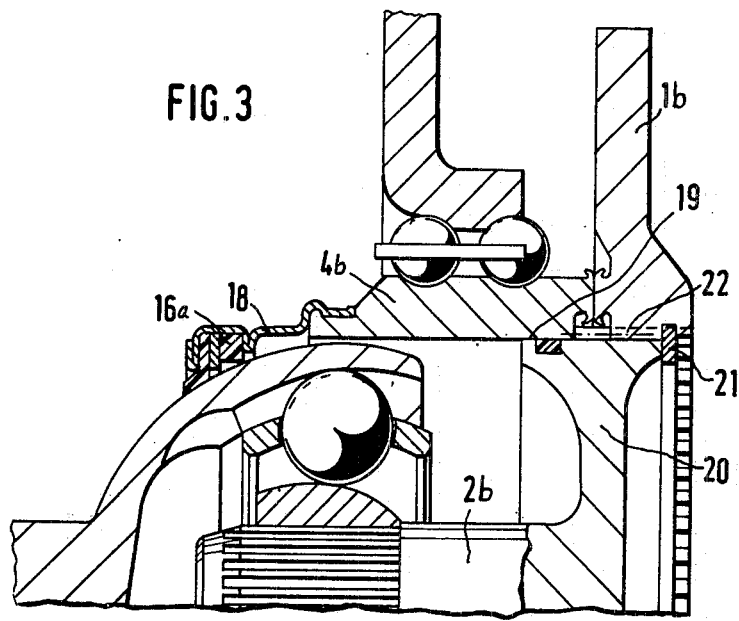
FIG. 3 is a view similar to that of FIG. 1 but showing a modification wherein the wheel hub and inner bearing ring are of a unitary construction.

In the wheel bearing assembly of FIG. 3, inner bearing ring 4b is inseparably connected with wheel hub 1b. The inner bearing ring 4b is provided with an axial bore 19 which receives a flange 20 interconnected to the wheel hub 1b by a meshing toothed configuration 22. A resilient ring 21 is seated within an annular groove as shown in FIG. 3 to position axially the flange 20. The flange 20 is also provided with an axially extending shaft or pin 2b upon which inner joint member 3 is mounted. The contact seal 16a is retained by the retainer 18 as previously described.

Figure 4:
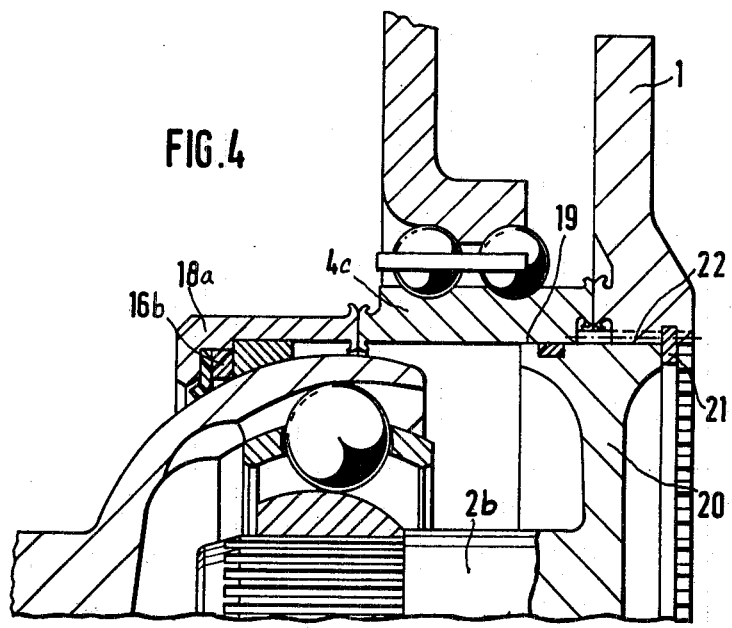
FIG. 4 is a view similar to that of FIG. 3 but showing another form of a seal for the universal joint.

In FIG. 4, there is provided a contact seal 16b which is retained in an annular member 18a extending axially from the inner end of the inner bearing ring 4c.

In the wheel bearing assembly of FIG. 5, the flange 20 is provided with an eccentric extension 23 which may be a simple, double, triple or polygonal extension whose central axis 24 is off-set with respect to the axis of rotation 25 of the bearing assembly by a distance a.

It is therefore apparent that one advantage of the wheel bearing assemblies as described above is that the relative spacing between the two joints of a cardan transmission shaft can be increased which thus results in smaller bending angles of the universal joints. A further result is that the center of the torque transmitting universal joint coincides with or is extremely close to the steering axis about which the wheel pivots so that the joint on the side of the wheel executes the same angle as the wheel when the wheel is pivoted during steering.

The wheel bearing assemblies provide ready and easy access for repair and maintenance work so as to facilitate assembly and disassembly operations. Upon removal of the wheel hub upon which is mounted the brake disc or the wheel the entire power transmission shaft can be withdrawn as a whole. Worn components may be quickly and easily replaced with a significant saving in time and expense.

The absence of an axial pin results in the entire bearing assembly being more compact, simpler in structure and of lighter weight which adds to the economy of operation of the vehicle.

The outer spherical surface of the outer joint member may be provided with a protective coating of a synthetic plastic material and the contact seal as described above engages this protective coating. The protective coating may comprise a sintered polyamide (RILSAN), a polytetrafluorethylene (TEFLON) or some other suitable synthetic plastic material. The seal is mounted in such a way so as not to be exposed to environmental conditions of hazards such as dirt, dust or water.

It is to be understood that this invention is susceptible to modification in order to adapt it to different usages and conditions, and accordingly, it is desired to comprehend such modifications within this invention as may fall within the scope of appended claims.

What is claimed is:

1. A bearing assembly for a motor vehicle wheel comprising an outer bearing ring attached to a wheel support and an inner bearing ring, said inner and outer bearing rings being spaced radially and having bearing elements therebetween to define a bearing assembly, a wheel hub attached to said inner bearing ring, a constant velocity universal joint having outer and inner joint members, said inner bearing ring having an outer peripheral surface and a bore therethrough with a diameter at least equal to the outer diameter of said outer joint member, said outer joint member being disposed within said bore of said inner bearing ring, a shaft extending from said wheel hub and connected to said inner joint member so that said wheel hub and inner bearing ring are rigidly connected to said inner joint member, and an annular flange on said wheel hub engaging one of said outer peripheral surface and bore of said inner bearing ring to center said hub with respect to said inner bearing ring.

2. A bearing assembly as claimed in claim 1 and means detachably connecting said wheel hub and said inner bearing ring.

3. A bearing assembly as claimed in claim 1 wherein said annular flange is positioned upon the outer peripheral surface of said inner bearing ring.

4. A bearing assembly as claimed in claim 1 wherein said wheel hub and inner bearing ring are inseparably connected.

5. A bearing assembly as claimed in claim 1 wherein said flange is inserted in said bore of the inner bearing ring.

6. A bearing assembly as claimed in claim 1 wherein said inner joint member is integral with said shaft.

7. A bearing assembly as claimed in claim 1 wherein said outer joint member has a spherical outer surface, and means on said inner bearing ring contacting said spherical outer surface for sealing between said inner bearing ring and said outer joint member.

8. A bearing assembly as claimed in claim 1 wherein said outer joint member has a spherical outer surface, there being a coating on said spherical surface.

9. A bearing assembly as claimed in claim 8 wherein said coating comprises a plastic material.

* * * * *